United States Patent [19]

Fletcher et al.

[11] 4,017,959

[45] Apr. 19, 1977

[54] METHOD OF FORMING SHRINK-FIT COMPRESSION SEAL

[76] Inventors: James C. Fletcher, Administrator of the National Aeronautics and Space Administration, with respect to an invention of Ted J. Podgorski, St. Paul, Minn.

[22] Filed: Apr. 1, 1976

[21] Appl. No.: 672,815

[52] U.S. Cl. .......................... 29/447; 29/DIG. 35; 53/9; 403/273
[51] Int. Cl.² .................................. B23P 11/02
[58] Field of Search ................ 29/447, DIG. 35; 350/96 R; 403/273; 53/9

[56] References Cited

UNITED STATES PATENTS

| | | | |
|---|---|---|---|
| 1,331,091 | 2/1920 | Becker | 29/447 |
| 2,768,475 | 10/1956 | Seelen et al. | 29/447 |
| 3,623,196 | 11/1971 | Bongenaar et al. | 29/447 X |
| 3,963,327 | 6/1976 | Poirier | 350/96 R X |

FOREIGN PATENTS OR APPLICATIONS

| | | | |
|---|---|---|---|
| 1,311,323 | 10/1962 | France | 29/447 |
| 550,126 | 12/1942 | United Kingdom | 29/447 |

*Primary Examiner*—Charlie T. Moon
*Attorney, Agent, or Firm*—Howard J. Osborn; William H. King; John R. Manning

[57] ABSTRACT

A method for making a glass-to-metal seal. A domed metal enclosure having a machined seal ring is fitted to a glass post machined to a slight taper and to a desired surface finish. The metal part is then heated by induction in a vacuum. As the metal part heats and expands relative to the glass post, the metal seal ring, possessing a higher coefficient of expansion than the glass post, slides down the tapered post. Upon cooling, the seal ring crushes against the glass post forming the seal. The method results in a glass-to-metal seal possessing extremely good leak resistance, while the parts are kept clean and free of contaminants.

5 Claims, 2 Drawing Figures

METHOD OF FORMING SHRINK-FIT COMPRESSION SEAL

ORIGIN OF THE INVENTION

The invention described herein was made in performance of work under a NASA contract and is subject to the provisions of Section 305 of the National Aeronautics and Space Act of 1958, Public Law 85-568 (72 Stat. 435; USC 2457).

BACKGROUND OF THE INVENTION

This invention relates generally to methods for producing glass-to-metal seals and more specifically to such seals produced by shrink-fit compression which are adaptable to aerospace applications where space and weight are primary limitations as are cleanliness, simplicity of construction, and superiority of seal performance.

Shrink-fit compression seals have been developed and used successfully by others in operations involving glass-to-metal seals. These were primarily large diameter seals wherein a metal compressed on ring worked against a soft sealing material to form a seal with the glass. Obviously, if the necessity of the soft sealing material could be eliminated, a lighter, smaller seal, having inherent advantages with respect to aerospace application, would be produced. There is therefore a definite need in the art for a method which will produce a superior glass-to-metal seal and which eliminates the use of a third medium as a binder.

It is therefore an object of the present invention to provide a glass-to-metal seal method using no other material in the seal.

It is a further object of the present invention to provide a method for producing glass-to-metal seals which are clean yet does not compromise the cleanliness of surrounding parts and structures.

An additional object of the present invention is to provide a method which produces glass-to-metal seals of superior leak resistance.

SUMMARY OF THE INVENTION

These and other objects of the present invention are obtained by providing a method of producing glass-to-metal seals which minimizes the disadvantages of prior art methods and offers a novel parts preparation and attachment method producing glass-to-metal seals of superior leak resistance, and characterized by simplicity and cleanliness. The present invention describes the process for preparing a domed metal cylinder and a glass post; their subsequent positioning, and the manner by which they are bonded together.

Specifically, a domed niobium cylinder is prepared with a seal ring. That is, an annulus is cut into the base of the cylinder, thereby providing the cylinder with a seal edge of desired edge width and surface finish. A fused quartz cylinder is machined to a slight taper and desired surface finish. The domed cylinder is placed atop the quartz post; then placed in a vacuum chamber which is subsequently evacuated. The metal dome is heated by induction which causes the annulus to expand relative to the low expansion quartz block and result in the metal dome sliding down the quartz post. Heating the dome and quartz post under vacuum to high temperatures tends to keep the parts clean and free of contaminants while the seal edge tends to soften and flow slightly. Upon progression of the dome a desired distance down the post, the parts are permitted to cool causing the seal edge to crush against the glass post forming the desired seal whereupon the assembly is removed from the evacuated chamber.

DETAILED DESCRIPTION

Figure 1:
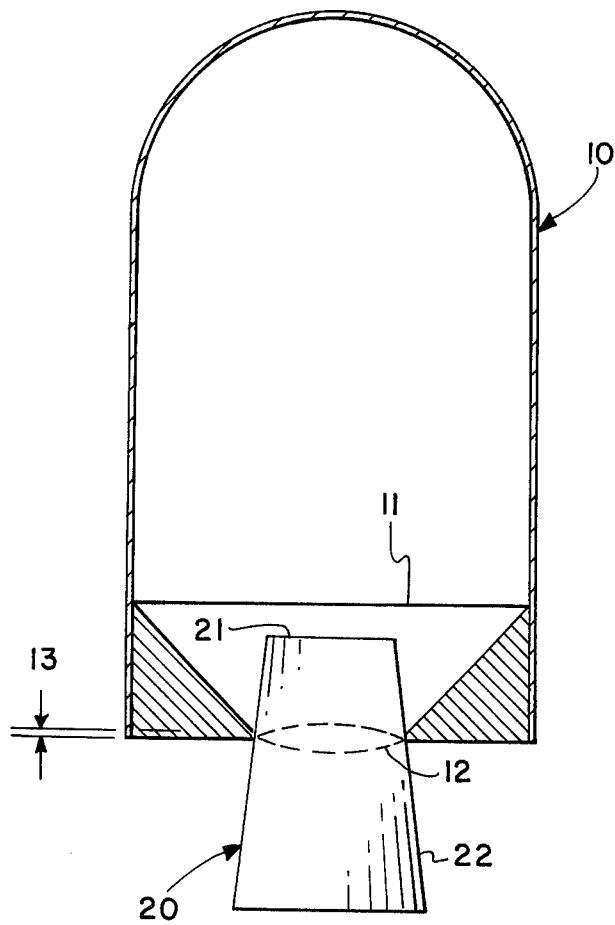
FIG. 1 is a cross section of the niobium dome and quartz post.

Referring now to the drawings and more particularly to FIG. 1, the present method consists in the first stage of the preparation of a domed niobium cylinder generally designated by reference numeral 10 and preparation of a fused quartz cylinder generally designated by reference numeral 20.

The domed niobium cylinder 10 is manufactured with a niobium seal ring 11 defining its base. The inner surface of seal ring 11 slopes downwardly and inwardly at an angle of 45 degrees to an annulus 12 machined at its base defined by a seal edge 13 of known width. The annulus is centered in the base of domed niobium cylinder 10 and posseses a known diameter, which, in the case of the preferred embodiment, is 0.375 inches.

In the preferred embodiment, seal edge 13 has a width of .004 inches. While this dimension is variable, a seal edge of lesser dimension, for example, less than 0.001 inches a "knife-edge", will result in small fractures in the quartz cylinder upon attachment of the niobium cylinder thereto. This condition reduces the leak resistance of the seal and may result in component failure. On the other hand, a seal edge width of too great a dimension, for example, greater than 0.008 inches, will reduce the leak resistance of the desired seal. Therefore, in the preparation of the seal ring the seal edge width is restricted to between 0.002 and 0.006 inches. This range has been found to practically eliminate the small fracture problem and to provide the best leak resistance.

The fused quartz cylinder 20 is machined such that it possesses a diameter slightly smaller than the annulus of the seal ring 21, in this instance less than 0.375 inches at its top and a 2° downward and outward taper along its length. The outer surface 22 of quartz cylinder 20 is then polished transparent, that is, fine ground to a surface finish of better than 16 microinches.

Figure 2:
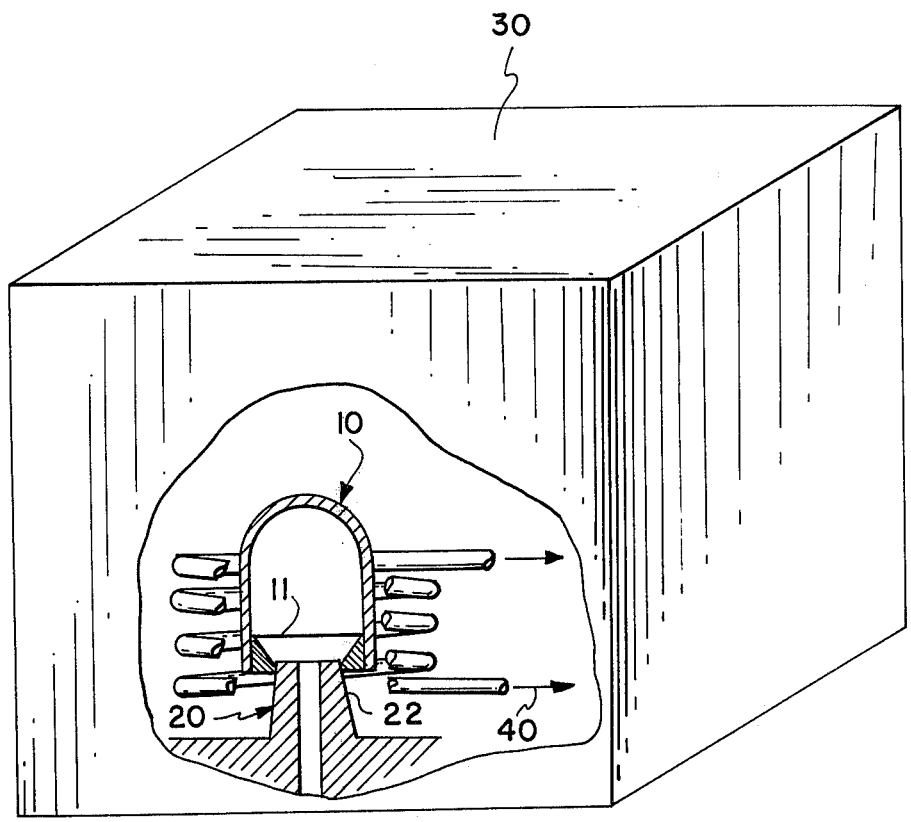
FIG. 2 is a plan view perspective of the niobium dome and quartz post placed inside a vacuum chamber, a portion shown cut away, and surrounded by an induction coil also having a portion shown cut away.

As shown in FIG. 2, following preparation of the niobium dome and quartz cylinder, the parts are positioned upright with the seal ring 11 of niobium dome 10 resting on tapered outer surface 22 of quartz cylinder 20. The assembly is then placed in a vacuum chamber 30 and surrounded by an induction coil 40. Vacuum chamber 30 is then evacuated and power applied to induction coil 40 so that the niobium seal ring 11 is heated to a bright red at which point the niobium dome 10 slides down the tapered quartz cylinder 20. As soon as the niobium dome stops dropping, heating is stopped. The parts are allowed to cool to room temperature, approximately 68° F., under vacuum, at which time the parts are removed from the vacuum chamber 30.

Heating to very high temperatures under vacuum tends to keep the parts clean and free of contaminants and, at high temperatures, the seal edge 13 tends to soften and flow slightly. In operation, the resulting seal is capable of sustaining a leak rate of less than $1 \times 10^{-9}$ standard cubic centimeters of helium per second.

It is to be understood that the preparatory steps taken, materials used and annulus configuration are merely the preferred embodiment of the present method. Various changes can be made in the shape, size and material as will be readily apparent to those skilled in the art without departing from the spirit and scope of the present invention.

What is claimed as new and desired to be secured by Letters Patent of the U.S. is:

1. A method of making a noncontaminated glass-to-metal seal between a glass post and a metal enclosure having an opening therein, the periphery of the opening being a seal edge of controlled dimensions, comprising the steps of:
   shaping said glass post such that its cross section is in the shape of said opening and such that it is tapered along its length with the resulting smaller end being slightly smaller than said opening; and such that its surface has a desired surface finish;
   placing said shaped glass post in an upright position with said smaller end up;
   placing said opening of said metal enclosure over said small end of said post so that the metal enclosure is supported by said post;
   heating said metal enclosure thereby causing it to expand and slip down said post; and
   cooling said metal enclosure whereby the seal edge of said metal enclosure crushes against said glass post forming the desired seal.

2. A method according to claim 1 including the steps of shaping the periphery of said opening in the metal enclosure such that the width of said seal edge is between 0.002 and 0.006 inches.

3. a method according to claim 1 including the step of placing said metal enclosure and said glass post under vacuum then performing the steps of heating said metal enclosure and cooling said metal enclosure to form the desired seal then removing said metal enclosure in conjunction with said glass post from said vacuum.

4. A method according to claim 1 wherein said glass post is a fused quartz post and the metal enclosure is a domed niobium cylinder.

5. A method according to claim 1 wherein heating is obtained through an induction coil.

* * * * *